: 3,526,662
Patented Sept. 1, 1970

3,526,662
EXTRACTION AND PURIFICATION OF TETRACYCLINE FROM FERMENTATION BROTHS
Artur Pereira da Luz, Lisbon, Portugal, assignor to CIPAN—Companhia Industrial Produtora de Antibioticos S.A.R.L., Lisbon, Portugal
No Drawing. Filed July 25, 1966, Ser. No. 567,379
Claims priority, application Portugal, July 30, 1965, 44,421
Int. Cl. C07c 103/19
U.S. Cl. 260—559                 4 Claims

ABSTRACT OF THE DISCLOSURE

A process for the extraction, recovery or purification of tetracycline from fermentation broths, which comprises: acidifying the broth to pH from 1.5 to 3.0 with sulfuric acid and filtering, changing the pH to 8.8 to 9.1 with sodium hydroxide, filtering and suspending the cake in one tenth to one twelfth of the volume of the filtered broth of a water-immiscible solvent containing oxygen, adding sodium chloride and washing the organic phase several times with water at pH 10, purifying the combined washings at pH between 1.5 and 2.5 with activated carbon, oxalic acid and potassium ferrocyanide and crystallizing the tetracycline by slow increase of the pH to a value between 3.8 and 4.3.

A variation of the process is disclosed in which the step of extraction with an oxygen-containing solvent immiscible with water is not carried out but instead the filtered cake obtained at pH 8.8 to 9.1 is suspended in one tenth of the original volume of water acidified with concentrated sulfuric acid, the calcium sulfate formed separated and the purification with activated carbon, oxalic acid and potassium ferrocyanide, and the tetracycline base is crystallized by increasing the pH slowly to 3.8 to 4.3 in the presence of a salt of ethylenediaminetetracetic acid.

---

This invention relates to an improved method for the extraction and purification of tetracycline produced by fermentation according to my copending application Ser. No. 801,739, filed Feb. 24, 1969, which is a continuation-in-part of our application Ser. No. 567,374, filed July 25, 1966, now abandoned, or any other process.

The present invention is an improvement on the process I previously claimed on my British Pat. No. 920,865. This improvement substantially reduces the quantity of solvents necessary or eliminates them completely.

When tetracycline was first produced biosynthetically it was obtained as a by-product of the production of chlortetracycline by a process described but not claimed in British specification No. 690,381. Later, tetracycline was produced chemically by cataytic hydrogenation of chlortetracycline by J. H. Boothe et al. (J. Amer. Chem. Soc. 75 4621, 1953) and L. H. Conover (ibidem 4622) but at present it is produced almost exclusively by fermentation for reasons of economy although, due to the complexity of fermented broths it is very difficult to extract and purify. The broth is filtered or centrifuged to remove the mycellium of the microorganisms as well as solid residues of the broth. Tetracycline may be obtained by many different ways one of the most used being the precipitation or the extraction of the antibiotic activity as a complex with calcium or magnesium and a mixture of alkyldimethylammonium and alkyltrimethylammonium chloride known as Arquad 16 (a trademark of the firm Armour & Co., U.S.A.). The tetracycline obtained by this process is, however, very difficult to obtain free of traces of Arquad 16. For this reason I devised the process of purification claimed in my British Pat. No. 920,865 that consists of extracting the filtered broth at pH 7.5–8.5 with a water-immiscible oxygen containing solvent like n-butanol and diluting the antibiotic-rich solvent with an aliphatic hydrocarbon and washing with water acidified with hydrochloric acid.

In the present invention the broth is acidified with 50% sulfuric acid to pH between 1.5 and 3.0 but preferably to 2.0 and centrifuged or filtered with the help of a filter aid. The clear liquid is brought slowly to pH 8.8–9.1 with 20% sodium hydroxide under stirring and the calcium and the magnesium salts of tetracycline filtered or centrifuged. The wet cake is then suspended in one tenth to one twelfth of the volume of the filtered broth of a water-immiscible solvent containing oxygen. This may be n-butanol, n-butyl acetate, isoamyl acetate or methylisobutylketone. The pH is brought to 1.5–2.5, preferably to 2.0 with sulfuric acid and some sodium chloride is added, particularly if n-butanol is the solvent preferred (30–150 gms. per liter of hydrous solvent). The mixture is allowed to decant and the solvent rich in antibiotic is separated, brought to pH 10 with sodium hydroxide and stirred 4–8 times with an equal volume of water. The combined aqueous washings are adjusted quickly to pH 1.5–2.5 and are treated with activated carbon (0.1–1.0%) to remove impurities. Solid oxalic acid (0.5–2.5 gm. per liter) is added and the pH is very slowly increased under continuously stirring to pH 3.8 to 4.3 with 20% sodium hydroxide. The crystallization of the pure tetracycline base is complete after 3 to 5 hours at room temperature. The crystals are filtered on a vacuum filter or on a basket centrifuge and dried on a fluid bed drier at 60° C. The overall yields vary from 75 to 90% and the purity may reach 99% with hardly any traces of ash.

By this process it is possible to obtain a very pure product with a substantial reduction in cost not only because of the reduction of the quantity of the oxygen containing water-immiscible solvent but also because of the complete elimination of the aliphatic hydrocarbon that also represents an added hazard because of its highly flamable properties.

I have also devised another way of carrying out my invention by which the use of solvents can be completely eliminated thus reducing production costs still further. For this the wet cake containing the calcium and magnesium salts of tetracycline is slurried with water and acidified carefully with concentrated sulfuric acid giving a solution containing practically all the tetracycline in one tenth the original volume of the filtered broth. After separating the calcium sulfate formed the solution is purified with activated carbon, oxalic acid and potassium ferrocyanide, and the tetracycline base is crystallized by increasing the pH slowly to 3.8–4.3 in the presence of 1 to 3 grams of a complexing agent related to ethylenediaminetetracetic acid.

The following specific examples are given as illustrations of the ways in which this invention may be carried out in practice.

EXAMPLE 1

Eight liters of concentrated filtered broth containing 6795 µg./ml. of tetracycline activity is brought to pH 8.8–9.0 with 20% sodium hydroxide and after stirring for one hour the suspension is centrifuged. The exhausted broth containing only 270 µg./ml. of tetracycline activity is discarded. The precipitate containing the tetracycline under the form of complex existent in the broth is suspended in 0.8 liter of hydrous n-butanol and the pH adjusted to 2.0 with 50% sulfuric acid. One hundred and fifty grams of technical sodium chloride are added under stirring until all the salt is under solution and the pH readjusted. The suspension is filtered and the residue washed with 400 ml.

of n-butanol at pH 2.0. Separate the solvent rich in tetracycline from the salt solution containing the impurities. An analysis of the two phases shows that the organic layer (950 ml.) contains 45345 µg./ml. of tetracycline, while the aqueous layer (350 ml.) contains about 2075 µg./ml.

The solution in butanol is extracted 5–6 times with water made alkaline to pH 10 with sodium hydroxide until the organic layer is exhausted. The pH of the combined washings is quickly changed to 1.5–2.0, 20 gms. of activated carbon are added and the whole stirred for 45–60 minutes. After separating the carbon, the clear solution is treated with 0.5 gm. of oxalic acid per liter of solution and 20% sodium hydroxide is slowly added with continuous stirring until the pH is between 3.8 and 4.3. Samples are collected and analysed to follow the rate of crystallization. After three hours the mother liquors contain only 1.400 µg./ml. of tetracycline and the crystals are collected on a vacuum filter on a basket centrifuge and dried on a vacuum oven at 60° C. The yield was 91.8%, that is 56 gms. of crystalline tetracycline base were obtained with an antibiotic content of 89.2% and a mixture content of 10% (98.9% on dry basis).

EXAMPLE 2

To ten liters of a solution of crude tetracycline containing 6.500 µg./ml., one gram of calcium chloride is added and the pH adjusted to 8.8 to 9.1 with 15% sodium hydroxide under stirring. After 45 minutes the solid present in suspension is filtered. The filtrate has a tetracycline potency of 300 µg./ml. and is discarded. The solid containing the remainder of the activity is dissolved in one liter of water brought to a pH of 1.5–2.0 with concentrated hydrochloric acid. After filtering the aqueous solution had a potency of 38.000 µg./ml. of tetracycline and a volume of 1.670 ml.; it was treated with 20 gms. of oxalic acid and sodium hydroxide added to bring the pH to 2.5. The calcium oxalate formed is filtered off and to the filtrate (1.600 ml.) containing 37.600 µg./ml. of tetracycline 2 gms. ethylenediaminetetracetic acid (disodium salt) are added and the pH slowly increased to 3.8–4.1 with 20% sodium hydroxide to bring about crystallization of the pure tetracycline base. After aging for four hours the crystallization had ended and the mother liquors had a concentration of 2.000 µg./ml. and were recycled. The crystalline base was filtered, washed with deionized water and dried on a fluid bed drier at 60° C., giving 41 gms. of product with a potency of 95.1% and a moisture content of 2.1%. Overall yield 60%.

What I claim is:

1. A process for the extraction, recovery or purification of tetracycline from fermentation broths which comprises: acidifying the broth to pH from 1.5 to 3.0 with sulfuric acid and filtering, changing the pH to 8.8 to 9.1 with sodium hydroxide, filtering and suspending the cake in one tenth to one twelfth of the volume of the filtered broth of a water-immiscible solvent containing oxygen, adding sodium chloride and washing the organic phase several times with water at pH 10: purifying the combined washings at pH between 1.5 and 2.5 with activated carbon, oxalic acid and potassium ferrocyanide and crystallizing the tetracycline by slow increase of the pH to a value between 3.8 and 4.3.

2. A process as claimed in claim 1 in which the step of extraction with an oxygen-containing solvent immiscible with water is not carried out but instead the filtered cake obtained at pH 8.8 to 9.1 is suspensed in one tenth of the original volume of water acidified with concentrated sulfuric acid, the calcium sulfate formed separated and the purification with activated carbon, oxalic acid and potassium ferrocyanide carried and salts of ethylenediaminetetracetic acid.

3. A process as claimed in claim 1 in which the oxygen containing solvent is an aliphatic alcohol or ketone or a lower alkyl acetate.

4. A process as claimed in claim 1 or 3 in which the oxygen containing solvent is n-butanol.

References Cited

FOREIGN PATENTS 920,865   3/1963   Great Britain.

ALEX MAZEL, Primary Examiner

A. M. T. TIGHE, Assistant Examiner